United States Patent Office 2,981,668
Patented Apr. 25, 1961

2,981,668

METHOD FOR IMPROVING THE PROPERTIES OF POLYMERIZED MATERIALS

Arno Brasch, Brooklyn, N.Y., assignor to Electronized Chemicals Corporation, Brooklyn, N.Y., a corporation of Delaware No Drawing. Filed Feb. 11, 1954, Ser. No. 409,758

6 Claims. (Cl. 204—154)

The present invention relates to the art of polymerized materials, particularly those which are moldable thermoplastic substances. "Moldable" here and throughout this description is used in the broad sense and is intended to include substances adapted for extrusions, rolled sheets and the like.

Most plastic substances, particularly those of the thermoplastic type, have relatively low melting or softening temperatures and in many instances have low resistance to organic solvents. As an example, polyethylene softens and articles made thereof lose their shape at temperatures below the boiling point of water and therefore polyethylene articles cannot be sterilized in a conventional manner at these temperatures. This greatly limits the usefulness of this substance for many articles for which it is otherwise well adapted. In addition polyethylene is soluble in xylene and benzene and similar organic solvents, particularly at elevated temperatures. There are additional characteristic physical or chemical weaknesses of polyethylene, polystyrene, and similar plastics which it is the object of the present invention to correct in a large measure. These particular substances should be considered as illustrative of a class rather than limitative of the invention.

The principal object of the present invention, therefore, is to provide a process for greatly increasing the physical and chemical resistance of certain thermoplastic substances.

An additional object of the present invention is to devise a novel process for raising the melting or softening point of certain thermoplastic substances.

An additional object is to devise a novel process for decreasing the solubility of certain thermoplastic substances in organic solvents.

Yet another object is to provide a novel process for increasing the property of certain thermoplastic substances commonly known as "memory."

Still another object is to provide a process for accomplishing the above in articles which have been previously molded from such plastic substances.

Yet another object is to produce cross-linking in certain thermoplastic substances.

Still another object is to produce changes in thermoplastic substances so as to give these substances novel properties.

Other objects and advantages will become apparent from the following description of a preferred embodiment of our invention.

Thermoplastic substances, such as polyethylene, polystyrene, nylon and the like have physical and chemical properties which admirably adapt these substances for certain purposes, but which greatly limit their utility. For instance, polyethylene has proved to be greatly useful for the formation of unbreakable bottles, compressible containers and like articles, but it has little utility for making infant feeding bottles, for instance, where sterilization in boiling water is the universal custom. This same lack of ability to withstand high temperatures also limits the use of polyethylene and certain other plastic substances for electrical insulation under conditions where these substances would be admirably adapted to the purpose were it not for the fact that temperatures may prevail which will cause softening of the insulation. Other examples could of course be given, but it will be appreciated that a process which overcomes these difficulties and greatly raises the melting or softening point and the resistance to organic solvents as well as increasing the memory of certain plastics has great utility in extending the usefulness of such substances.

I have found that bombardment with high velocity electrons brings about a very striking and unexpected improvement in the properties of many of these substances and fulfills the objectives set out above. As an example, polyethylene tube, bottles, sheet, foil and electric insulation, all of which soften at approximately the boiling point of water, and all of which are soluble in xylene and benzene, for instance, particularly at elevated temperatures, have been subjected by me to electron bombardment. The following is a typical example:

Polyethylene insulated wire having an insulation wall thickness of ¼ inch, was irradiated with electrons of 2.2 million volts energy for a sufficient period to subject every part of the polyethylene insulation to a dose of 8 million rep. This is equivalent to an energy absorption of about twenty calories per gram. Samples of this wire with the irradiated insulation along with control pieces taken from the original sample were subjected to hot air in an oven with the following results.

When the temperature within the oven reached about 200° F., the control pieces, which had not been bombarded with electrons, started to soften and melted shortly thereafter (at about 212° F.). This of course was expected, since it is known that polyethylene melts at these temperatures. The pieces which had been bombarded with electrons, however, according to this process had not softened, and retained their shape even after the temperature was raised to 400° F. At 400° F. the insulation was subjected to a heavy reduction in cross section by squeezing the material mechanically. Upon release of the mechanical pressure, the polyethylene material immediately resumed its original shape. This was repeated many times without appreciably affecting the memory of the polyethylene material.

This ability of the polyethylene after electron bombardment to retain its shape and memory at high temperatures persisted even though the high temperatures were maintained sufficiently long to cause a pronounced browning and eventually a partial charring of the polyethylene.

Polyethylene readily swells in the presence of certain organic solvents, and will dissolve under some conditions. As an example, pieces of untreated polyethylene were subjected at 200° F., to a mixture of 50% xylene and 50% benzene. Also pieces of the same sample of polyethylene, which had been bombarded under the conditions set forth above to a total dose of 10 million rep., were subjected to exactly the same treatment. At the end of three hours it was found that the untreated polyethylene had completely dissolved in the solvent to form a uniform paste-like mass. The samples which had been bombarded with electrons, however, showed only slight swelling in an equal length of time.

Under similar conditions, in a twenty-four hour test where the polyethylene material was subjected to the same mixture of solvents, but at lower temperature, that is, at ordinary room temperature, practically no swelling at all took place of the samples which had been bombarded, whereas the untreated samples were reduced to a paste-like consistency.

Tests with unmixed solvents give the following results.

Test pieces were ½ gm. samples taken from 2 mm. thick polyethylene sheet. The solvent was maintained at 84° C.±1°. Treated samples were bombarded to a dose of 8 million rep.

| Solvent | Solubility of Control | Solubility of Treated Samples |
| --- | --- | --- |
| Xylene | 1 hr.—34.3%<br>2 hr.—45.2% | 1 hr.—7.88%.<br>2 hr.—10.0%. |
| Toluene | 3.5 hr.—68.3%<br>5 hr.—99.9% | 3.5 hr.—19.2%.<br>5 hr.—23.8%. |

I have found that the effect produced by the electron bombardment upon polyethylene and similar plastic substances is not of a transitory nature, since the improved properties described above are equally apparent in samples of polyethylene which were bombarded with electrons in the manner described and then stored for periods of more than three years.

An indication of the increase in the memory characteristics of polyethylene will be apparent from the following example:

Similar discs, one inch in diameter, were cut from a sheet of polyethylene one-sixteenth of an inch thick. Some of these were untreated and served as controls. The others were bombarded to a total dose of 10 million rep. with high velocity electrons at two million electron volts. Samples of each were then subjected to pressure between the flat platens of a small laboratory press for a period of thirty minutes at a platen temperature of 200° F. While maintaining this pressure the platens of the press were cooled to room temperature and the pressure released. It was found that both irradiated and untreated pieces had been distorted during the heat and pressure treatment to form thin sheets almost ten inches in diameter. The samples which had been bombarded with electrons, however, quickly returned almost to their original size and shape, whereas the control pieces remained at the large diameter and showed no tendency to resume their original shape when they were reheated.

Although any source of ionizing, penetrating, electrons having sufficient penetrating ability is suitable for the purpose, the equipment actually used by me in practicing this process is similar to that forming the subject matter of Patent No. 2,429,217 issued to Arno Brasch October 21, 1941.

This equipment is of the type in which a plurality of capacitors are charged in parallel and discharged in series across spark gaps, the discharge potential being applied to an electron accelerating tube having an electron permeable window.

It will be appreciated by those familiar with this art that the voltage of the equipment, or in other words, the velocity of the electrons used in the treatment should be enough to penetrate the plastic substance sufficiently to give the article the desired properties. In the examples given above, voltages of the order of one million to two million were used. If it is desired to treat plastics articles by this process in such fashion that all of the plastics substance in the article has the improved properties, then it is necessary to provide equipment which supplies free electrons at a velocity sufficient to penetrate the plastics substance completely. Of course lower voltage equipment can be used if the plastics article is irradiated from both sides, and still less may be used if it is desired to give the improved physical and chemical characteristics to only a surface layer of the plastics substance.

As an example of the latter variation of the basic process, it will be appreciated that under some conditions, for instance where the resistance to attack by organic solvents is the important characteristic desired, it is usually sufficient to irradiate the article only to a shallow depth, the result being that the highly resistant surface layer will protect the less resistant interior. In some cases where raising the melting point is the chief improvement desired, it is sufficient to impart the improved properties to a surface layer, since if the surface layer does not soften, this resistant enclosure will hold the article together sufficiently for some purposes at least even though the central portion becomes soft.

The total dose will vary, depending upon the amount of improvement it is desired to impart to the plastics article and upon the material being treated. For instance in the previous examples the improvement imparted to the articles by doses of 8 million and by 10 million rep. is described. Considerably lower doses have utility in improving the physical and chemical properties of such substances to a less extent and therefore for some purposes it will not be necessary to use doses as high as those specified above. Although it is probable that some theoretical increase in the physical and chemical resistance of plastic substances is obtained at low electron doses, as a practical matter little improvement of significance is obtained until the dose reaches a level of something of the order of one million rep. The improvement in the properties of certain other substances, such as nylon and polystyrene when given this treatment is similar to the effect on polyethylene, but in all cases with which I am familiar the change in properties is less marked than it is with polyethylene.

So far as we have been able to determine, plastics substances such as polyethylene for instance, do not seem to be appreciably changed in their more apparent and ordinary characteristics by this treatment. That is, a polyethylene bottle which has been bombarded with electrons to 8 million to 10 million rep. will have substantially the same appearance and substantially the same resistance to flexure as will a similar article which has not been bombarded. Standing side by side they ordinarily cannot be distinguished from each other, but the improved properties of the article which has been bombarded are immediately apparent in the presence of organic solvents or at elevated temperatures. An exception to this is that if the plastic substance incorporates dyes or impurities which impart some color to the article, there usually will be some bleaching by the bombardment process. As an example, commercial polyethylene insulated wire which is ordinarily slightly amber in color is somewhat bleached by being bombarded to eight million rep., but the change is sufficiently slight so that the difference can hardly be detected excepting when samples of the bombarded and untreated articles are viewed together.

An investigation of this phenomenon indicates that the electron bombardment produces three effects which take place together. These are, polymerization, depolymerization and cross-linking between the long chain molecules of the substance. It appears that in all substances of this general category all three effects are produced simultaneously to some extent. The cross-linking which takes place brings about the increase in the physical and chemical properties described above. Depolymerization and polymerization on the other hand produce changes which are better understood. In polyethylene, nylon, polystyrene, certain fluorine rubbers, and silicones, among others, the cross-linking effect seems to predominate. Even though some slight depolymerization or additional polymerization also takes place, the change in properties is due principally to the production of cross-linking bonds. There are some substances, however, where depolymerization appears to predominate. Methyl methacrylate is an example of such a substance. So far as we know, there is no way to tell in advance which effect will be the most pronounced with a particular untried substance, but in any event, changes always take place which produce substances having novel properties.

From the above description of this process it will be seen that articles can be molded from a wide range of thermoplastic polymers in the conventional manner, and then these articles can be treated by electron bombardment so as to produce changes which frequently greatly improve their physical and chemical characteristics for certain purposes.

Having described my invention, what I claim as new and useful and desire to secure by Letters Patent is:

1. The method of providing a molded polyethylene article which will not be deformed in boiling water, which comprises molding said article from polyethylene and subsequently subjecting said molded article to ionizing penetrating radiation in the form of high energy electrons until said molded article has received a dose of not less than one rep.

2. The method of raising the melting point, decreasing solubility and increasing the memory of polyethylene which includes the step of radiating polyethylene with ionizing penetrating radiation in the form of high energy electrons to a total dose of approximately 8 million rep.

3. The process for improving the form stability and the solvent resistance of polyethylene which comprises irradiating polyethylene with primary radiation consisting essentially of high energy electrons emanating from a high voltage accelerating apparatus, said irradiation being carried out to a dose of at least about $3 \times 10^6$ rep.

4. The process for improving the form stability at temperatures above 120° C. and the solvent resistance in toluene of polyethylene which comprises irradiating polyethylene with primary radiation consisting essentially of high energy electrons emanating from a high voltage accelerating apparatus in which the electrons have energies of from about 50,000 to 20,000,000 electron volts, said irradiation being carried out within a dose range of from about $3 \times 10^6$ rep. to $5 \times 10^8$ rep.

5. The method of improving the form stability of polyethylene sheet which comprises subjecting said sheet to ionizing penetrating radiation in the form of high energy electrons until said polyethylene sheet has received a dose of not less than one megarep.

6. The process for improving the form stability and the solvent resistance of polyethylene which comprises irradiating polyethylene with primary radiation consisting essentially of high energy electrons emanating from a high voltage accelerating apparatus, said irradiation being carried out to a dose of at least about one megarep.

References Cited in the file of this patent

UNITED STATES PATENTS 2,648,097     Kritchever _____ Aug. 11, 1953

OTHER REFERENCES

Nature, December 20, 1952, pages 1075, 1076 (article by Little).

Nature, January 24, 1953, page 167 (article by Charlesby).

Nature, July 11, 1953, pages 76, 77 (article by Lawton et al.).

Proceedings of Royal Society of London, vol. 215, November-December 1952 (article by Charlesby), pages 187–191, 203 and 206–212.